United States Patent

Choi

[11] Patent Number: 6,118,988
[45] Date of Patent: Sep. 12, 2000

[54] TRANSMISSION POWER CONTROL SYSTEM AND METHOD FOR A MOBILE STATION

[75] Inventor: Jun-Hyuk Choi, Tae-gu, Rep. of Korea

[73] Assignee: Hyundai Electronics Industries Co., Ltd., Ichon-shi, Rep. of Korea

[21] Appl. No.: 09/126,599

[22] Filed: Jul. 31, 1998

[30] Foreign Application Priority Data

Mar. 2, 1998 [KR] Rep. of Korea .................. 98-6708

[51] Int. Cl.[7] .................................................. H04Q 7/20
[52] U.S. Cl. .................... 455/115; 455/522; 455/126
[58] Field of Search ................ 455/522, 69, 234.1, 455/235.1, 217, 249.1, 250.1, 254, 126, 127, 115, 116

[56] References Cited

U.S. PATENT DOCUMENTS

| | | | |
|---|---|---|---|
| 4,563,775 | 1/1986 | Yokosuka | 455/126 |
| 5,193,223 | 3/1993 | Walczak et al. | 455/115 |
| 5,212,814 | 5/1993 | Iwane | 455/126 |
| 5,689,815 | 11/1997 | Yamazaki | 455/69 |
| 5,839,056 | 11/1998 | Hakkinen | 455/69 |
| 5,873,028 | 2/1999 | Nakano et al. | 455/69 |
| 5,887,245 | 3/1999 | Lindroth et al. | 455/69 |
| 5,974,093 | 8/1999 | Lee | 375/297 |

*Primary Examiner*—Thanh Cong Le
*Assistant Examiner*—Yemane Woldetatios
*Attorney, Agent, or Firm*—Fleshner & Kim, LLP

[57] ABSTRACT

A transmission power control system and method is provided that controls the magnitude of transmission power in proportion to the distance between a base station and a mobile station. The transmission power control system provides the exact transmission power by compensating for an error between a real gain and a gain controlled value according to the magnitude of the transmission power. The transmission power control system can be used, for example, in a mobile phone. The transmission power control system can include a transmission part, a mobile station modem, a power detector, a gain difference controlling part and a power amplifier controlling part. The transmission part outputs a transmission power signal in accordance with input signals. The power detector transforms the transmission power signal into a DC voltage. The mobile station modem outputs a first and second gain control values, respectively, based on the DC voltage. The gain difference controlling part generates a gain difference control signal and applies the gain difference control signal to the transmission part in accordance with the first gain control value and an attenuated signal. The power amplifier controlling part outputs a power amplifier gain control value to the transmission part in accordance with the DC voltage and the second gain control value.

20 Claims, 3 Drawing Sheets

TRANSMISSION POWER CONTROL SYSTEM AND METHOD FOR A MOBILE STATION

BACKGROUND OF THE INVENTION

1. Field of the Invention

The present invention relates to a transmission power control system, and in particular, to a transmission power control system in a mobile phone.

2. Background of the Related Art

In the beginning of the mobile communication technology, a wireless communication system directly processed radio signals using a transmitter and receiver. Today, most of a mobile communication transmission in air communication networks such as a phone net is performed by wire with a wireless system only used for transmissions in an area near a mobile station. A plurality of base stations are required for reciprocal radio communication or the like with the mobile station.

Accordingly, the mobile station only needs to contact the base station for communication. Thus, the mobile station needs to stay within the communication service area of at least one base station.

The communication service area of a base station is called a cell. Each mobile station registers its location to a network for designating one or a small number of cells possibly containing the mobile station when the base station or network wants to call the mobile station. The location registration is closely related to the network service area providing the mobile communication service.

A mobile station can be installed in a ship, an aircraft, a car or a portable mobile station i.e., a mobile phone. Carried by a user, the portable mobile station has to be lightweight. The development of electronics miniaturization has contributed to many lightweight parts. However, batteries have experienced a retarded improvement of power capacity per unit weight. Further, transmitting power has very significant impact to the service area of a cell.

The wider the cell becomes, the larger the size of a battery becomes. Accordingly, the cell has to be reduced in size (e.g., range) to reduce the battery requirements. However, reducing the cell size increases the number of cells and increases the maintenance cost for the network, in particular, in high demand or dense base stations areas.

To reduce battery consumption for the mobile station, the transmitting power from the mobile station to the base station is set according to the distance between the mobile station and the base station. Thus, the mobile station will not transmit more power than the maximum necessary. Accordingly, the magnitude of the power transmitted from the mobile station is fixed to the maximum range of the cell. However, when the distance between the base and mobile station is small (i.e., less than the maximum range), the unnecessary battery consumption is inevitable because the power transmission is more than is necessary. Thus, it is important for the mobile station to generate an exact magnitude of the transmission power by evaluating the distance between the mobile and base station.

FIG. 1 shows a block diagram of a related art transmission part and a transmission power controlling part in a mobile phone. The transmission part is composed of an automatic gain control amplifier 10, a mixer 12, a pre-amplifier 14 and a power amplifier 16.

A high frequency signal from a modulator is inputted to the automatic gain control amplifier 10. The gain of the automatic gain control amplifier 10 is controlled by a gain controlling signal outputted from a mobile station modem 24. A high frequency signal outputted from the automated gain control amplifier 10 is mixed with a local oscillation signal LO in the mixer 12. During the mixing process, a carrier frequency corresponding to the high frequency signal is adjusted upwardly to a frequency of the local oscillation signal LO to because a RF (Radio Frequency) signal.

Not large enough to be an input signal for the power amplifier 16, the RF signal from the mixer 12 is amplified in the pre-amplifier 14. The pre-amplifier 14 amplifies the RF signal to the required magnitude to drive the power amplifier 16 and then outputs the RF signal to the power amplifier 16.

The power amplifier 16 amplifies the RF signal to the magnitude for actual transmission through an antenna 18. A power detector 20 detects a magnitude of the RF signal by converting the transmission power of the actual transmission into a DC signal.

In the power amplifier 16 in the transmission part, the gain is controlled by the mobile station modem 24. An A/D converter (ADC) 22 converts the DC signal from the power detector 20 into a digital signal, which is input to the mobile station modem 24.

The mobile station modem 24 includes various kinds of devices for controlling the mobile station. A variety of data necessary to control the mobile station are stored in a look-up table 25 in the mobile station modem 24. The mobile station modem 24 is supplied with the distance between the mobile and base station through an extra receiving part.

The base station provides the mobile station with the information of the distance by an open-loop power check. The mobile station modem 24 picks up the data for controlling (e.g., a gain controlling signal) the magnitude of the transmission power from the look-up table 25 in accordance with the distance previously supplied from the base station.

A gain controlling signal of the power amplifier 16 among the data picked up from the look-up table 25 is converted into an analog signal by a D/A converter 26 and inputted into a comparator 28. The comparator 28 outputs a signal proportional to the difference between a detected signal of the power detector 20 and an output signal of the D/A converter 26 to the power amplifier 16. The gain of the power amplifier 16 is controlled by the signal from the comparator 28. Further, the output signal of a D/A converter 30 controls the automatic gain control amplifier 10.

The D/A converter 30 outputs a DC signal that has been converted from a Pulse Density Modulation (PDM) signal in the mobile station modem 24. The value of the PDM signal is decided by the open-loop power check between the mobile station and base station with information regarding the transmission power by evaluating both the magnitudes of the transmission power of the mobile station and of the base station when transmitting between the mobile and base station.

The mobile station generates a controlling value programmed in accordance with the relationship of transmission power to distance. The distance is provided to the mobile station from the base station.

The variable range of the gain is narrow in the related art transmission power controlling part of the mobile phone because the power amplifier 16 amplifies the signal, which was already amplified by the pre-amplifier 14.

As described above, the related art mobile phone has various disadvantages. Once the signal outputted from the automatic gain control amplifier 10 is changed whereby the gain of the automated gain control amplifier 10 varies, the final level of the output becomes unstable. Hence, the magnitude of the transmission power has decreased reliability and the operation of the automatic gain control amplifier 10 driven by the programmed data is unreliable.

SUMMARY OF THE INVENTION

An object of the present invention is to provide a transmission power control system in a mobile station that substantially obviates one or more of the problems caused by limitations and disadvantages of the related art.

Another object of the present invention is to provide a mobile station that generates a transmission power having increased accuracy.

Another object of the present invention is to provide a mobile station that generates a reduced transmission power by matching the power transmission to the required distance.

Another object of the present invention is to provide a mobile station that generates a increased reliability of mobile station communications by matching the transmission power to the distance to the base station.

Another object of the present invention is to provide a mobile station that generates a transmission power by compensating for an error between the real gain and the gain control value according to the magnitude of the transmission power.

Another object of the present invention is to provide a mobile station where an actual gain of the automatic gain control amplifier is detected from the outputted transmission power and a difference between the real gain and the gain control value supplied from the base station is used to modify the gain control of the automatic gain control amplifier.

To achieve these objects and other advantages in a whole or in parts and in accordance with the purpose of the present invention, as embodied and broadly described, a transmission power control system according to the present invention is provided that includes a transmission part that receives a modulated signal and outputs a transmission power signal based on a gain difference control signal, a power detector that transforms said transmission power signal into a DC voltage, a mobile station modem that outputs a first, second, third and fourth gain control values, respectively, based on the DC voltage, a gain difference controlling part that generates a gain difference control signal and applies said gain difference control signal to said transmission part in accordance with said first gain control value and an attenuated signal, and a power amplifier controlling part that outputs a fifth gain control value to said transmission part in accordance with said DC voltage and said second gain control value.

To further achieve these objects and other advantages in a whole or in parts and in accordance with the purpose of the present invention, as embodied and broadly described, a transmission power control system includes a transmission part that receives outputs a transmission power signal based on input signals, a power detector that transforms said transmission power signal into a representative value, a mobile station modem that outputs a first and second gain control values, respectively, based on the representative value, a gain difference controlling part that generates a gain difference control signal and applies said gain difference control signal to said transmission part in accordance with said first gain control value and an attenuated signal and a power amplifier controlling part that outputs a third gain control value to said transmission part in accordance with said representative value and said second gain control value.

To further achieve these objects and other advantages in a whole or in parts and in accordance with the purpose of the present invention, as embodied and broadly described, a method of controlling a transmission power control system includes receiving a modulated signal and outputting a transmission power signal based on a gain difference control signal using a power transmission part, transforming said transmission power signal into a representative DC voltage, outputting a first, second, third and fourth gain control values, respectively, based on the DC voltage using a mobile station modem, outputting a power amplifying gain control value to said transmission part in accordance with said DC voltage and said second gain control value and generating a gain difference control signal and applying said gain difference control signal to said modulated signal in accordance with said first gain control value and an attenuated signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
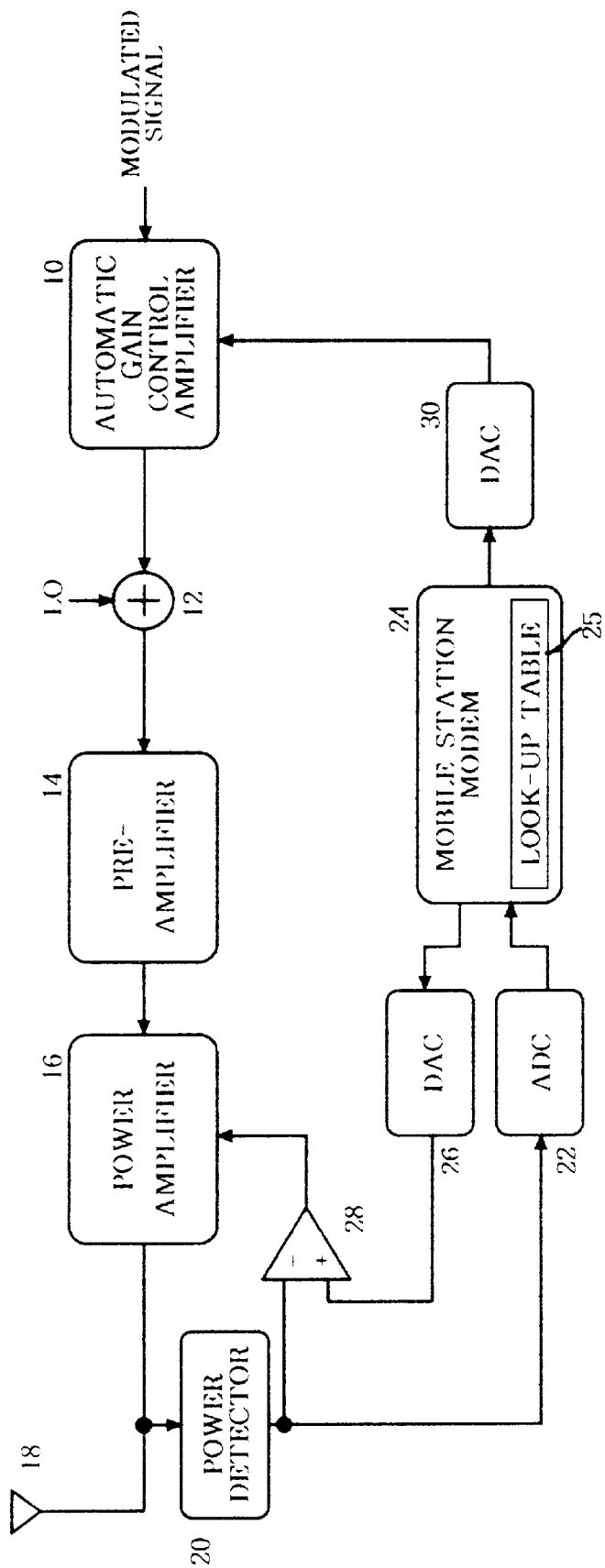
FIG. 1 is a block diagram showing a transmission part and a transmission power controlling part in a related art mobile phone.
Figure 2:
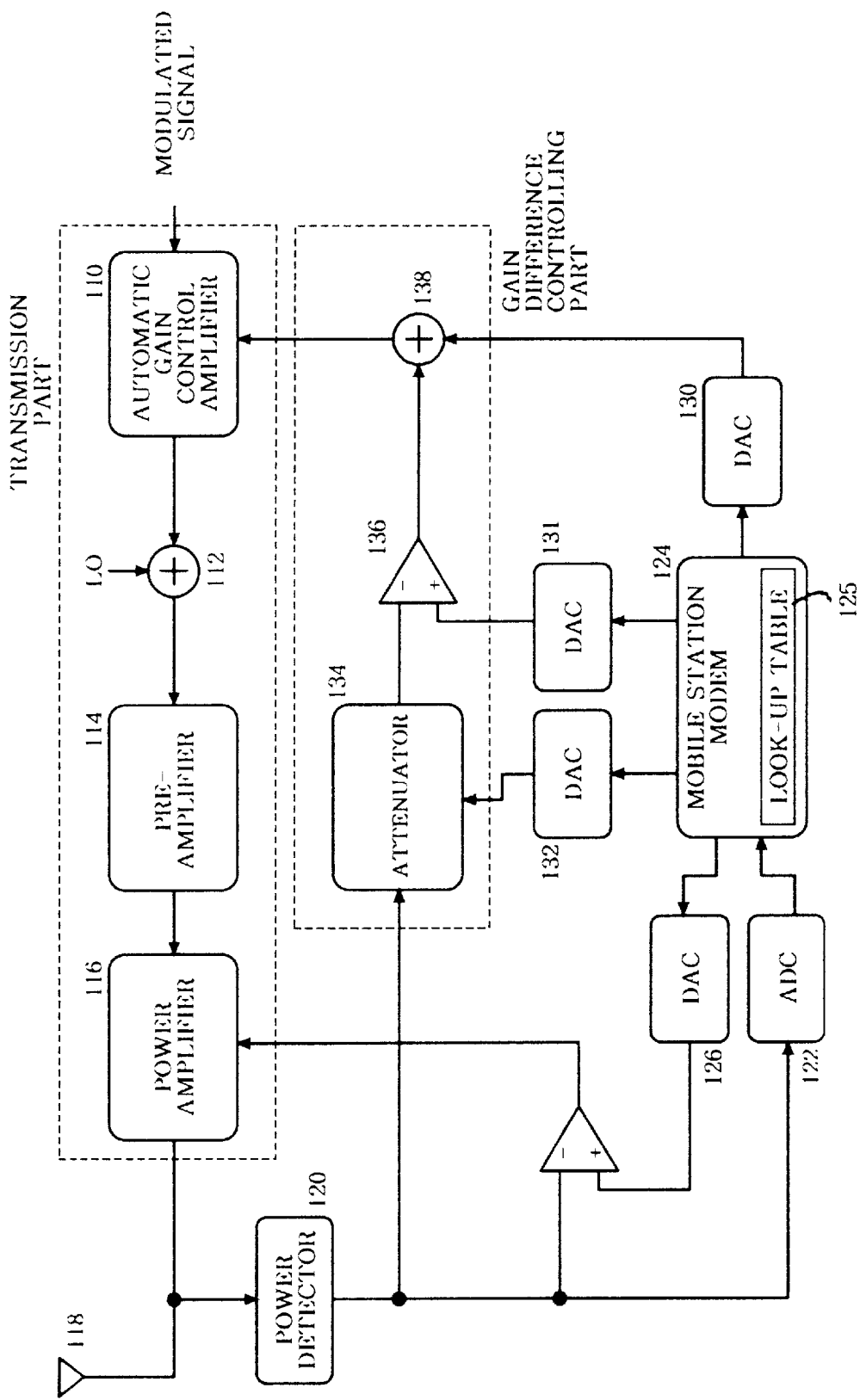
FIG. 2 is a block diagram showing a preferred embodiment of a transmission part and a transmission power controlling part in a mobile station according to the present invention.

FIG. 2 is a block diagram showing a preferred embodiment of a transmission part and a transmission power controlling part in a mobile station such as a mobile phone according to the present invention. A transmission part includes an automatic gain control amplifier 110, a mixer 112, a pre-amplifier 114 and a power amplifier 116.

The automated gain control amplifier 110 receives a high frequency signal from a modulator. The gain of the automated gain control amplifier 110 is controlled by a gain control signal from a mobile station modem 124.

The high frequency signal from the automatic gain control amplifier 110 is mixed with a local oscillation signal LO by a mixer 112. A carrier frequency of the high frequency signal is adjusted upwardly to the local oscillation signal LO by the mixer 112 to be a RF (Radio Frequency) signal.

Not large enough to be an input signal for the power amplifier 116, the RF signal from the mixer 112 is sufficiently amplified by a pre-amplifier 114 to drive the power amplifier 116 and is applied to the power amplifier 116.

The power amplifier 116 amplifies the pre-amplified RF signal to an actual magnitude for transmission through an antenna 118. A power detector 120 detects a transmission power transmitted through the antenna 118. The power detector 120 preferably detects a level of the antenna 118 transmission by changing the transmission power into a DC signal.

The gain of the power amplifier 116 in the transmission part is controlled by an A/D converter (ADC) 122, a D/A converter (DAC) 126 and a comparator 128. The A/D converter 122 changes the DC signal from the power detector 120 into a digital signal.

A mobile station modem 124 includes a variety of circuits or units necessary to control the mobile station. A variety of data required for the mobile station modem 124 to control the mobile station are stored in a look-up table 125 in the mobile station modem 124. The mobile station is supplied with information about a distance from the base station.

The base stations supplies the mobile station with the distance by an open-loop power check. The mobile station modem 124 outputs data required to control the magnitude of the transmission power from the look-up table 125 in accordance with the distance information, which has been provided by the base station. The data from the look-up table 125 of the mobile station modem 124 includes the data of the power amplifier 116, the pre-amplifier 114 and the automatic gain control amplifier 110.

The gain control data of the power amplifier 116 among the outputted data is applied to the comparator 128 after being changed into an analog signal by the D/A converter 126. The comparator 128 supplies the power amplifier 116 with a gain control signal proportional to the difference between the output of the D/A converter 126 and the detected signal of the power detector 120. The gain of the power amplifier 116 is controlled by the gain control signal from the comparator 128.

The gain control data of the automatic gain control amplifier 110 is changed into an analog signal by a D/A converter 130 and then outputted to an adding circuit 138. The adding circuit 138 is in a gain difference controlling part of the mobile station.

The attenuating circuit 134 receives the DC signal from the power detector 120. A level of the DC signal is attenuated by the attenuating 134 to the amount of the output signal of the D/A converter 132 and then outputted to a comparator 136. The signal outputted to the D/A converter 132 from the mobile station modem 124 is a control signal for attenuating the DC signal by a sum of gains of the mixer 112, the pre-amplifier 114 and the power amplifier 116. The control signal from the mobile station modem 124 is converted to an analog signal by the D/A converter 132.

Accordingly, the magnitude of the actual signal outputted by the automated gain controlling amplifier 110 is recognized in the output signal of the attenuator 134. The D/A converter 131 changes an expected output data of the automated gain control amplifier 110 into an analog signal.

The mobile station modem 124 predicts the magnitude of the output signal of the automated gain controlling amplifier 110 by reciprocally referring to both the present gain controlling signal from the D/A converter 130 and the intrinsic characteristic of the automated gain controlling amplifier 110, which has been stored in the look-up table 125. Having been transformed into an analog signal by the D/A converter 131, the result of the prediction is applied to the comparator 136 as a reference signal. The output signal of the attenuating circuit 134 is applied as a comparative signal to the comparator 136.

The output signal of the comparator 136 is a difference between the actual magnitude of the power outputted from the automated gain control amplifier 110 and the ideal magnitude of the power outputted by the automatic gain control amplifier 110 predicted by the system.

When the actual output of the automated gain control amplifier 110 is larger than the value predicted by the system, the comparator 136 generates a negative signal that reduces the output of the adding circuit 138. The value of the output signal from the adding circuit (i.e., the gain control signal of the automated gain controlling amplifier 110) is reduced, and the actual gain of the automated gain control amplifier 110 is also reduced to approach a targeted value.

When the output of the adding circuit 138 is increased on account of the positive signal from the comparator 136, the predicted value of the system is larger than the actual magnitude. Thus, the actual gain of the automated gain control amplifier 110 is increased to approach the targeted value based on the increase of the gain control signal of the automatic gain control amplifier 110 output by the adding circuit 138.

Figure 3:
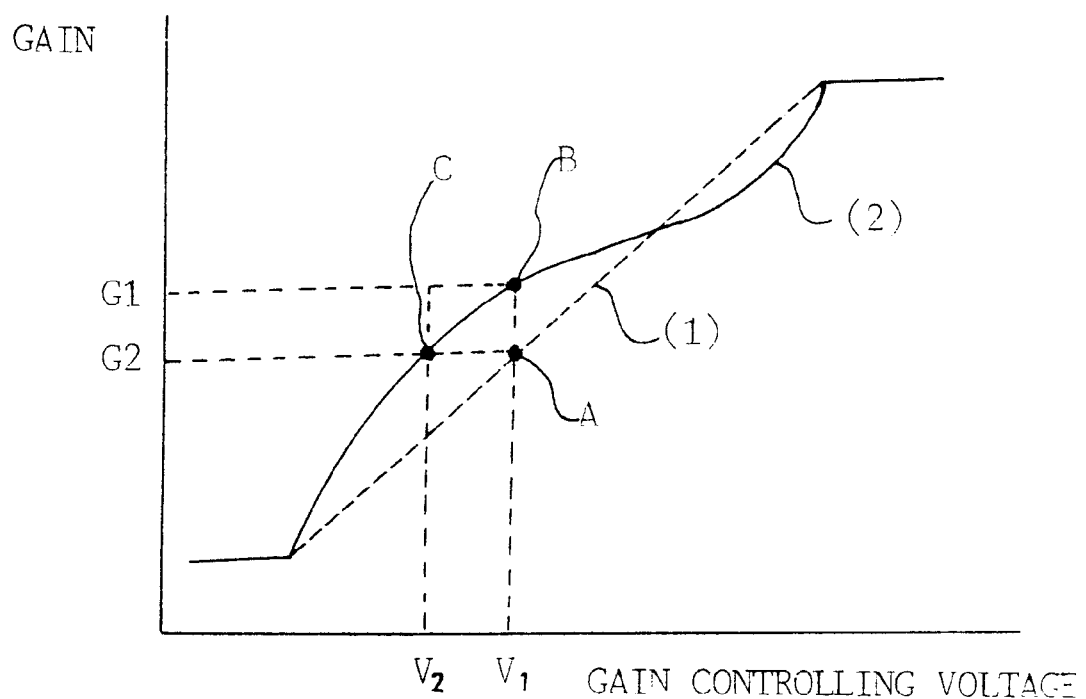
FIG. 3 is a diagram showing a relation between gain and gain controlling voltage in accordance with the transmission power controlling part of FIG. 2.

FIG. 3 shows a graph of relation between gain and gain control voltage based on the preferred embodiment of the transmission power controlling part according to the present invention in the mobile phone. As shown in FIG. 3, an X-axis shows the level of DC voltage of a gain control voltage and a Y-axis shows the gain of the automated gain control amplifier 110.

A straight-line 1 denoted as a dotted line in FIG. 3 represents the gain controlling value of the automated gain controlling amplifier 110. The gain controlling value is the object of the mobile station modem 124 and is decided by the distance information between the present mobile and base station and the transmission power. Hence, the gain controlling value may be different from the gain of the automatic gain controlling amplifier 110.

A curved-line 2 denoted as a solid line in FIG. 3 shows the actual gain of the automated gain controlling amplifier 110, which is different than the object or ideal value from the mobile station modem 124. The gains of the targeted value 1 and the actual value 2 are G1 and G2, respectively, when the gain controlling voltage at the X-axis is $V_1$.

The point A is the gain for the mobile station modem 124, and the point B is the gain of the automated gain controlling amplifier 110. Once the gain controlling voltage goes from $V_1$ to $V_2$, the gain does from G1 to G2. Thus, the gain of the automated gain controlling amplifier 110 is controlled to be the gain having the magnitude required for the mobile station modem 124.

As described above, the preferred embodiment of the transmission power control system according to the present invention has various advantages. The preferred embodiment of the transmission control power system can provide a mobile station or the like that generates the exact transmission power by compensating for an error between the real gain and the gain controlled value according to the magnitude of the transmission power. The real gain of the automated gain control amplifier is detected from the outputted transmission power and then the difference between the real gain and the gain controlled value, which is based on distance information from the base station, is reflected on the gain control of the automated gain controlling amplifier.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. For example, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A transmission power control system, comprising:
    a transmitter that receives a modulated signal and outputs a transmission power signal based on a gain difference control signal;
    a power detector that transforms said transmission power signal into a DC voltage;
    a mobile station modem that outputs a first, second, third and fourth gain control values, respectively, based on the DC voltage; and
    a gain difference controller that generates said gain difference control signal and applies said gain difference control signal to said transmitter in accordance with said first gain control value and an attenuated signal,
    wherein said gain difference controller comprises,
        an attenuator that attenuates said DC voltage based on said third gain control value and outputs said attenuated signal,
        a comparator that generates a difference between said first gain control value and said attenuated signal, and
        an adding circuit that generates said gain difference control signal by adding said difference and said fourth gain control value.

2. The transmission power control system of claim 1, further comprising, a power amplifier controller that outputs a fifth gain control value to said transmitter in accordance with said DC voltage and said second gain control value.

3. The transmission power control system of claim 2, wherein a first digital to analog converter outputs said first gain control value to said comparator.

4. The transmission power control system of claim 2, wherein a second digital to analog converter outputs said third gain control value to said attenuator, and wherein a third digital to analog converter outputs said fourth gain control value to said adding circuit.

5. The transmission power control system of claim 2, wherein said transmitter part comprises;
    an automatic gain control amplifier that receives said modulated signal and said gain difference control signal;
    a mixer that mixes a local oscillation signal with the output of said automatic gain control amplifier;
    a pre-amplifier that amplifies the mixed signal to a pre-determined magnitude; and
    a power amplifier that receives said fifth gain control signal and amplifies the pre-amplified signal to the transmission power signal.

6. The transmission power control system of claim 1, wherein said first gain control value is predicted power in said mobile station modem.

7. The transmission power control system of claim 2, wherein a fourth digital to analog converter outputs said second gain control value to said power amplifier controller.

8. The transmission power control system of claim 1, wherein said transmitter power signal includes a RF signal outputted from said transmission part.

9. A transmission power control system, comprising:
    a transmitter that receives and outputs a transmission power signal based on input signals;
    a power detector that transforms said transmission power signal into a representative value;
    a mobile station modem that outputs a first and second gain control values, respectively, based on the representative value;
    a gain difference controller that generates a gain difference control signal and applies said gain difference control signal to said transmitter in accordance with said first gain control value and an attenuated signal; and
    a power amplifier controller that outputs a third gain control value to said transmitter in accordance with said representative value and said second gain control value wherein the attenuated signal is based on the representative value and a fourth gain control value from the mobile station modem.

10. The transmission power control system of claim 9, wherein said input signals comprise;
    a modulated signal and said gain difference control signal inputted to an automatic gain control amplifier;
    a local oscillation signal inputted to a mixer; and
    said third gain control value inputted to a power amplifier.

11. The transmission power control system of claim 9, wherein said first gain control value is predicted power in said mobile station modem.

12. The transmission power control system of claim 9, wherein the mobile station modem outputs said fourth gain control value and a fifth gain control value based on the representative value, and wherein said gain difference controller comprises:
    an attenuator that attenuates said representative value based on said fourth gain control value and outputs said attenuated signal; and
    a combiner circuit that generates the gain difference control signal based on the first gain control value, said fifth gain control value and the attenuated signal.

13. The transmission power control system of claim 12 wherein said combiner circuit comprises:
    a comparator that generates a difference between said first gain control value and said attenuated signal; and
    an adding circuit that generates said gain difference control signal by adding said difference and said fifth gain control value.

14. The transmission power control system of claim 11, wherein a first digital to analog converter outputs said first gain control value to said comparator, wherein a second digital to analog converter outputs said fourth gain control value to said attenuator, and wherein a third digital to analog converter outputs said fifth gain control value to said adding circuit.

15. The transmission power control system of claim 11, wherein said transmitter comprises;
    an automatic gain control amplifier that receives said modulated signal and said gain difference control signal;
    a mixer that mixes a local oscillation signal with the output of said automatic gain control amplifier;
    a pre-amplifier that amplifies the mixed signal to a pre-determined magnitude; and
    a power amplifier that receives said third gain control signal and amplifies the pre-amplified signal to the transmission power signal.

16. The transmission power control system of claim 13, wherein the fourth gain control value is based on the sum of gains of the mixer, the pre-amplifier and the power amplifier.

17. A method of controlling a transmission power control system, comprising:

receiving a modulated signal and outputting a transmission power signal based on a gain difference control signal using a power transmitter;

transforming said transmission power signal into a representative DC voltage;

outputting a first, second, third and fourth gain control values, respectively, based on the DC voltage using a mobile station modem;

outputting a power amplifying gain control value to said power transmitter in accordance with said DC voltage and said second gain control value; and generating a gain difference control signal and applying said gain difference control signal to said modulated signal in accordance with said first gain control value and an attenuated signal, wherein said generating a gain difference control signal comprises
attenuating said DC voltage based on said third gain control value and outputting said attenuated signal,
generating a difference between said first gain control value and said attenuated signal, and
outputting said gain difference control signal by adding said difference and said fourth gain control value.

18. A transmission power control system, comprising:

a transmitter that receives and outputs a transmission power signal based on input signals;

a power detector that transforms said transmission power signal into a representative value;

a mobile station modem that outputs first and second gain control values, respectively, based on the representative value;

a gain difference controller that generates a gain difference control signal and applies said gain difference control signal to a first amplifier of the transmitter in accordance with said first gain control value and an attenuated signal; and a power amplifier controller that outputs a third gain control value to a second amplifier of the transmitter in accordance with said representative value and said second gain control value, wherein said transmitter comprises,
said first amplifier that receives said modulated signal and said gain difference control signal,
a mixer that mixes a local oscillation signal with the output of said first amplifier,
a pre-amplifier that amplifies the mixed signal to a predetermined magnitude, and
said second amplifier that receives said third gain control signal and amplifies the pre-amplified signal to the transmission power signal.

19. The transmission power control system of claim 18, wherein the mobile station modem outputs a fourth gain control value and a fifth gain control value based on the representative value, and wherein said gain difference controller comprises:

an attenuator that attenuates said representative value based on said fourth gain control value and outputs said attenuated signal; and a combiner circuit that generates the gain difference control signal based on the first gain control value, said fifth gain control value and the attenuated signal.

20. The transmission power control system of claim 18, wherein the mobile station modem outputs fourth and fifth gain control values, respectively, based on the representative value, and wherein said gain controller comprises:

an attenuator that attenuates said representative value based on said fourth gain control value and outputs said attenuated signal;

a comparator that generates a difference between said first gain control value and said attenuated signal; and an adding circuit that generates said gain difference control signal by adding said difference and said fifth gain control value.

* * * * *